June 7, 1960   J. E. FLEISSNER   2,939,182
BOX FEEDER, IN PARTICULAR FOR PASSING TEXTILE FIBRES
TO MACHINES AND THE LIKE FOR THEIR
SUBSEQUENT PROCESSING
Filed Sept. 2, 1958
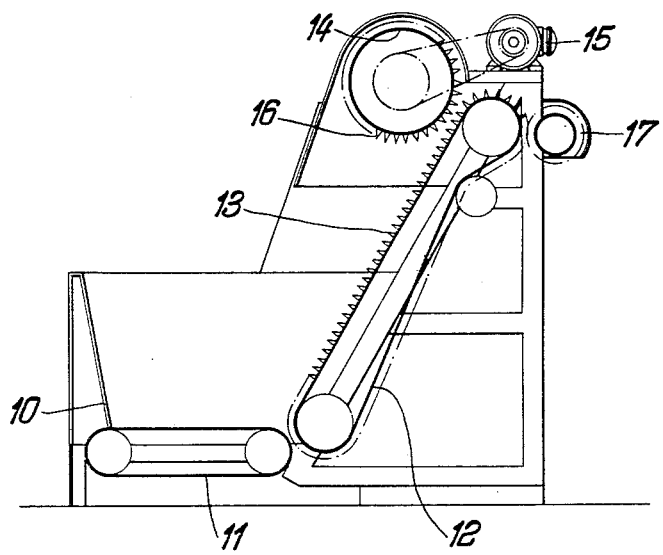
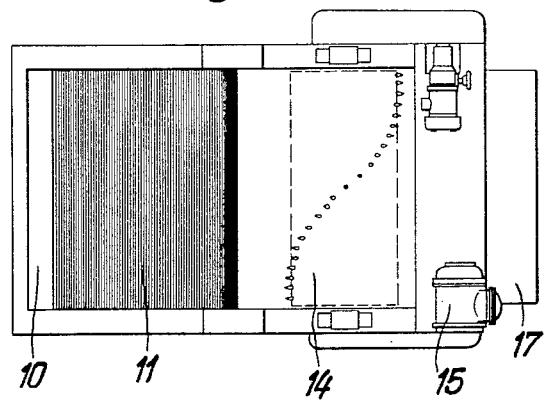
*Inventor:*
Johann Edmund Fleissner
By
Bailey, Stephens + Huetty
*Attorneys*

2,939,182

BOX FEEDER, IN PARTICULAR FOR PASSING TEXTILE FIBERS TO MACHINES AND THE LIKE FOR THEIR SUBSEQUENT PROCESSING

Johann Edmund Fleissner, Egelsbach, near Frankfurt am Main, Germany, assignor, by mesne assignments, to Fleissner & Co. G.m.b.H., Frankfurt am Main, Germany Filed Sept. 2, 1958, Ser. No. 758,346

Claims priority, application Germany Mar. 20, 1958

1 Claim. (Cl. 19—79)

The present invention relates to a box feeder, in particular for passing textile fibres to machines for their subsequent processing.

Box feeders consist of a horizontal conveyor belt in a box, which horizontal belt conveys the fibres to a conveyor belt, provided with needles, which conveys the fibres upwardly, and of a stripping device which passes the superfluous material back in the downward direction. The known stripping devices in box feeders consist of swinging rakes which strip the superfluous material and throw it back into stock or supply box. The swinging rakes move from top to bottom over the belt conveying the material upwardly. The return stroke is performed as a no-load stroke, the swinging rakes being raised. When use is made of such swinging rakes, it frequently happens, particularly when the material is wet, that tangled masses of material come between the rakes and the band conveying the material upwardly. As soon as the swinging rake engages these masses it is subjected to an extremely powerful resistance, which is frequently so great that even a powerful motor driving the rake is brought to a stop. This results in break-downs in operation, and it is an object of the present invention to provide a box feeder in which such breakdowns are obviated.

According to the invention, the stripping appliance which is associated with the belt conveying the material upwardly in a box feeder consists of a plucking or picking drum rotating at high speed, mounted at the upper end of the inclined conveyor belt and provided with needles which engage the material being conveyed. The needles of the plucking or picking drum move in the direction opposite to that of the conveyor belt.

The plucking or picking drum is preferably provided with one row of needles disposed spirally upon the casing of the drum, which needles engage in the range of the needles on the inclined conveyor belt. By means of this form of construction of the box feeder, the breakdowns occurring when use is made of swinging rakes are completely avoided since no unfavorable impact loading is exerted upon the driving motor. The needles of the highspeed plucking or picking drum, pluck or pick any superfluous material from a mass of wet material being conveyed upwardly and, for the rest, throw the superfluous mass back into the box. Thus the superfluous material is completely plucked or picked from the tangled masses. In this manner the material is considerably better opened. After passing the plucking or picking drum, the material is passed in known manner by the needle conveyor belt to a stripping roller which brushes it continuously from the conveyor belt. The material then passes to the machine next in succession after the box feeder.

One embodiment of the invention is diagrammatically illustrated by way of example in the accompanying drawing, in which:

Figure 1 shows, in longitudinal section, a box feeder according to the invention, and Figure 2 is a plan view of the box feeder shown in Figure 1.

The base of the box 10 is formed by a conveyor belt 11, which conveys the fibrous material present in the box 10, preferably textile fibres, to the conveyor belt 12. The conveyor belt 12 is directed obliquely upwards, and is provided with needles 13. The material is fed on to the needles and conveyed upwardly. At the upper end of the needle conveyor belt 12 is provided a plucking or picking drum 14 which is caused to rotate at high speed by means of a motor 15. The plucking or picking drum 14 is provided with one row of needles 16. These needles run spirally round the casing of the plucking or picking drum, one row being shown so arranged in Figure 2. The needles are so arranged that they engage to some extent in the range of the needles 13 of the conveyor belt 12. The direction of rotation of the plucking or picking drum is such that the needles 16 move in a direction opposite to that of the needles 13.

If now the conveyor belt 11 conveys a wet, tangled mass of material on to the conveyor belt 12, so that the mass is carried upwards by the needles 13, then the needles 16 on the plucking or picking drum which is rotating at high speed strike quickly into the mass and pluck or pick it, each time throwing the superfluous mass of the material back into the box 10. The action of the plucking or picking drum at this point results in an efficient opening, not only of the material delivered in normal manner, but also of any wet, tangled masses of material which may be conveyed upwardly by the needles 13. The material passes between the plucking or picking drum and the conveyor belt 12, and is conveyed by the needles 13 to a stripping roller 17 which brushes the material continuously from the needles 13 of the conveyor belt 12 and passes it to the next processing machine (not shown).

There is no longer any possibility of blockage and break-down with a box feeder of this type, since the tangled masses conveyed are plucked or picked piece by piece, and thus cannot bring to a standstill even a driving motor which is less powerful than those normally employed.

What I claim is:

In combination with a box feeder for textile fibres having a horizontal conveyor belt, a vertically inclined belt having needles for moving fibres upwardly from said horizontal belt, means for moving said belts, and a picking drum mounted adjacent the upper end of said inclined belt for removing excess fibres therefrom, the improvement comprising a single row of needles spirally mounted around the entire longitudinal length of the surface of said drum for removing excess fibres from said inclined belt, and motor means connected to said drum for rotating said drum at a high speed in a direction opposite to that of said inclined belt for opening tangled masses of fibres carried by said inclined belt by being picked by said needles and returning the picked fibres to said horizontal belt.

References Cited in the file of this patent

UNITED STATES PATENTS

| | | |
|---|---|---|
| 411,534 | Sargent et al. | Sept. 24, 1889 |
| 655,167 | Prior | Sept. 3, 1901 |
| 731,764 | Fordyce | June 23, 1903 |